UNITED STATES PATENT OFFICE.

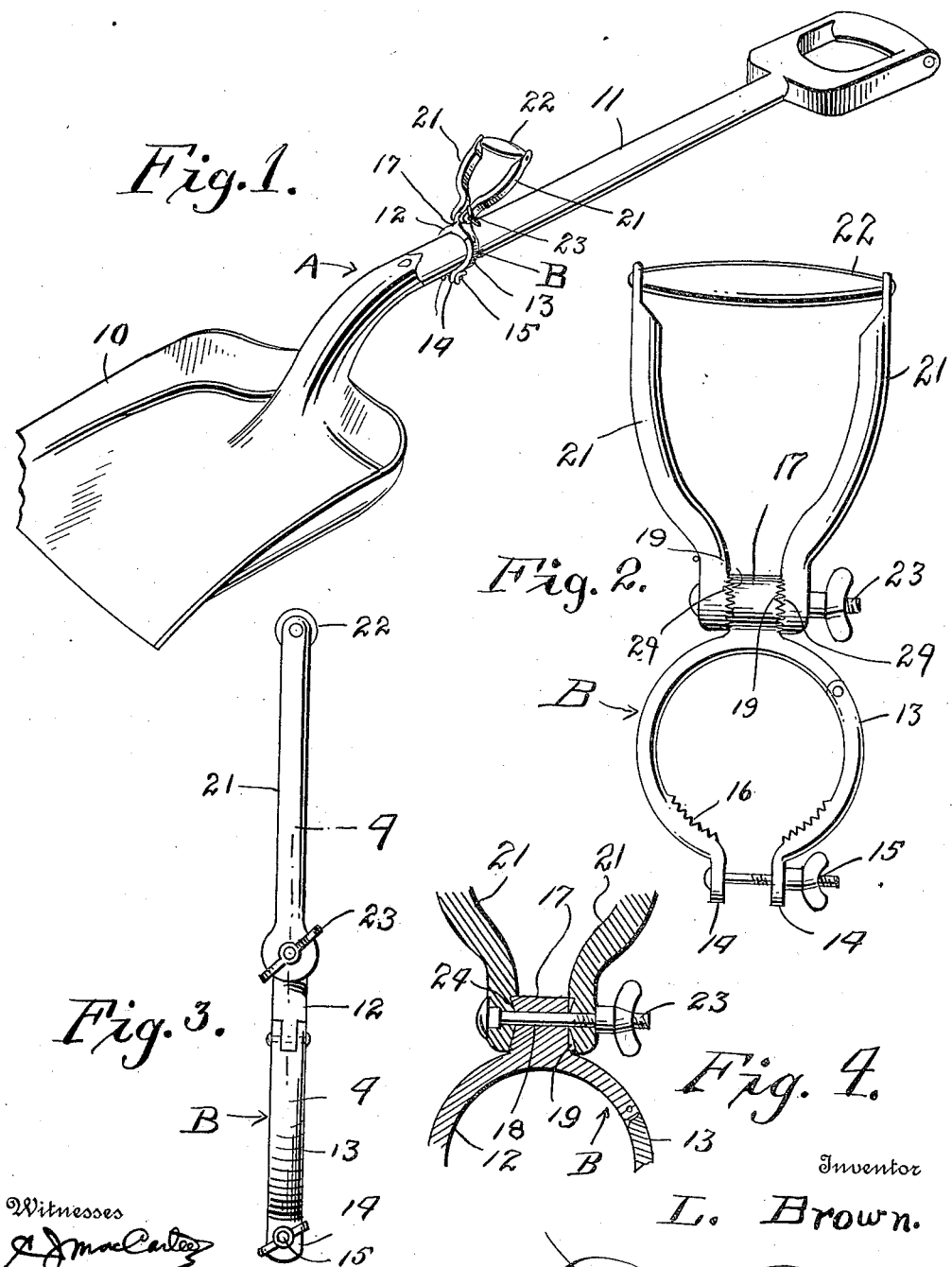

LEO BROWN, OF ONAKA, SOUTH DAKOTA.

SUPPLEMENTARY SHOVEL-HANDLE.

1,083,054.  Specification of Letters Patent.  Patented Dec. 30, 1913.

Application filed January 22, 1913. Serial No. 743,606.

*To all whom it may concern:*

Be it known that I, LEO BROWN, a citizen of the United States, residing at Onaka, in the county of Faulk, State of South Dakota, have invented certain new and useful Improvements in Supplementary Shovel-Handles; and I do hereby declare the following to be a full, clear, and exact description of the invention, such as will enable others skilled in the art to which it appertains to make and use the same.

This invention relates to supplementary shovel handles.

The object of the invention resides in the provision of a supplementary handle for shovels and like implements which are adapted to be quickly and conveniently applied to any desired portion of the handle of the implement, and which affords greater lifting power and less labor and fatigue and greater convenience in manipulating the implement, said handle being also capable of a wide range of adjustment to regulate its leverage or lifting action.

With the above and other objects in view, the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a perspective view of the shovel showing the supplementary handle applied. Fig. 2, a front elevation of the supplementary handle and attaching clamp. Fig. 3, a side view of what is shown in Fig. 2, and, Fig. 4, a section on the line 4—4 of Fig. 3.

Referring to the drawings, A indicates a shovel which includes the usual scoop member 10 and handle 11.

The supplementary handle includes a clamp member B comprising pivotally connected sections 12 and 13, the free ends of said sections being provided respectively with outwardly extending portions 14 through which is engaged a binding screw 15. The sections 12 and 13 are provided on their inner faces with teeth 16 which are adapted to bite upon the handle bar 11 when the clamp B is disposed in embracing relation thereto and the binding screw 15 properly manipulated. Formed on the section 12 is an outwardly extending ear 17 provided with a central perforation 18 and having its side portions provided with radially arranged teeth 19. The ear 17 is embraced by the side member 21 of a supplemental handle, the free ends of the said side members being connected by a handle grip 22. Passing through the side members 21 and ear 17 is a binding screw 23 whereby the clamp member B and the yoke 21 are pivotally connected. The inner faces of the inner ends of the side members 21 are also provided with radially arranged teeth 24 which are adapted to coöperate with the teeth 19 when the binding screw 23 is operated to clamp the side members 21 against the ear 17. By providing the teeth 19 and 24 it will be apparent that the supplemental handle may be secured in a great number of angular adjustments with respect to the handle bar 11, such adjustments being determined by the requirements of the particular work in hand.

What I claim is:—

A supplementary handle for shovels and the like comprising a clamp for engagement with the handle bar of the implement, said clamp comprising pivotally connected sections, a binding screw engaged through the ends of said pivotally connected sections for drawing same into clamping relation to a handle bar, an ear formed on one end of the sections of said clamp, a handle yoke including side members embracing the ear on the clamping section, a binding screw passing through said side members and ear pivotally connecting the clamp and side members, coöperating teeth on the adjacent faces of said side members and ear adapted to be secured in interlocking relation by the manipulation of the binding screw passing through the side members and ear whereby said side members may be positively locked in different angular adjustments to the handle bar, and a hand grip connecting the free ends of said side members.

In testimony whereof, I affix my signature, in the presence of two witnesses.

LEO BROWN.

Witnesses:
 C. C. JARVIS,
 GEO. HAM.

Copies of this patent may be obtained for five cents each, by addressing the "Commissioner of Patents, Washington, D. C."